United States Patent [19]
Karolys et al.

[11] Patent Number: 6,013,108
[45] Date of Patent: Jan. 11, 2000

[54] INTELLIGENT SENSOR SYSTEM WITH NETWORK BUS

[75] Inventors: Alexis G. Karolys, San Clemente; Nikul Kapadia; Fernando Gen-Kuong, both of Laguna Niguel, all of Calif.

[73] Assignee: Endevco Corporation, San Juan Capistrano, Calif.

[21] Appl. No.: 09/037,223

[22] Filed: Mar. 10, 1998

Related U.S. Application Data

[60] Provisional application No. 60/041,293, Mar. 18, 1997.

[51] Int. Cl.[7] ..................................................... G06F 13/00
[52] U.S. Cl. ........................ 792/189; 702/186; 702/122; 710/62; 710/69; 710/72
[58] Field of Search ................................ 702/31–32, 122, 702/185–189; 73/660; 710/62, 69, 72

[56] References Cited

U.S. PATENT DOCUMENTS

| | | | |
|---|---|---|---|
| 4,184,205 | 1/1980 | Morrow | 702/34 |
| 4,701,870 | 10/1987 | Mogi et al. | 702/120 |
| 4,716,527 | 12/1987 | Graciotti | 710/66 |
| 4,980,844 | 12/1990 | Demjanenko et al. | 702/56 |
| 5,067,674 | 11/1991 | Heyche et al. | 244/314 |
| 5,121,064 | 6/1992 | Eller | 324/601 |
| 5,220,519 | 6/1993 | Eller | 364/579 |
| 5,414,645 | 5/1995 | Hirano | 702/185 |
| 5,430,663 | 7/1995 | Judd et al. | 364/550 |
| 5,576,972 | 11/1996 | Harrison | 702/128 |
| 5,700,090 | 12/1997 | Eryurek | 374/210 |

FOREIGN PATENT DOCUMENTS

| | | |
|---|---|---|
| 0450829A1 | 10/1991 | European Pat. Off. . |
| 2670890A1 | 6/1992 | France . |

OTHER PUBLICATIONS

IEEE P1451.2 D2.01, IEEE Draft Standard, "A Smart Transducer Interface for Sensors and Actuators—Transducer to Microprocessor Communication Protocols and Transducer Electronic Data Sheet (TEDS) Formats," pp. 1–91 (Oct. 17, 1996).

Firth, S. R. and Mitchell, Jr., M. J., "IBM System/370 Channel/Unibus Interface", (vol. 24, No. 12) IBM Technical Disclosure Bulletin (May 1982).

*Primary Examiner*—Marc S. Hoff
*Assistant Examiner*—Bryan Bui
*Attorney, Agent, or Firm*—Hamilton, Brook, Smith & Reynolds, P.C.

[57] ABSTRACT

This invention disclosure describes an intelligent sensor system in which different types of sensors are connected to a network communication bus. Analog and digital signals are transferred bi-directionally on the common communication bus between the distributed sensors and an application specific controller referred to as a bus converter/controller module (BCM). The traditional analog type sensors are connected to the communication bus through interface devices referred to as transducer-to-bus interface modules (TBIM). The TBIM provides sensor identification, self-test and data correction functions.

16 Claims, 3 Drawing Sheets

PWR: Power
A1DIO: Analog 1/Digital Input/Output+
A2DIO: Analog 2/Digital Input/Output−
GND: Ground & # x20;

INTELLIGENT SENSOR SYSTEM WITH NETWORK BUS

RELATED APPLICATION

This application claims priority to U.S. Provisional Application Ser. No. 60/041,293, filed on Mar. 18, 1997 which is incorporated herein by reference in its entirety.

BACKGROUND OF THE INVENTION

Sensors, also known as transducers, are used to measure different types of phenomena such as temperature, acceleration, pressure and flow and convert these phenomena to analog voltages. In the manufacturing of large aircraft, extensive testing routines are employed in which hundreds and even thousands of sensors are deployed throughout the aircraft. In a typical test configuration, each of the sensors is coupled to a data acquisition and analysis system using an individual pair of wires resulting in very large bundles of cables throughout the aircraft. Modal analysis and the factory environment are other applications in which a multitude of distributed sensors is typically deployed with each sensor individually and separately connected to a data analysis system.

SUMMARY OF THE INVENTION

Prior art sensors require dedicated wires to signal conditioning and data acquisition subsystems. These sensors each have different types of interfaces and, therefore, differing signal conditioning. Prior art sensor measurement systems have several drawbacks: they require a significant amount of interconnection wires, one set per sensor; it is very difficult to keep track of and identify each sensor; each sensor type has a different interface and requires a special type of signal conditioner and data handling; system reliability goes down proportionally with the amount of interconnection cables and connectors; and once a large measurement system is set up, it is difficult to determine if all the sensors are operating correctly and to isolate and locate problems.

There is a need for a system that provides a common interface across a variety of sensor types to reduce installation and maintenance costs. Further, there is a need for a system that provides a network type interface to reduce the cost and weight associated with cabling to sensors.

The intelligent sensor system of the present invention solves the above problems by providing a common four wire communication bus for interconnecting sensors in a measurement system.

The present invention is directed to a network arrangement of intelligent or smart sensors. Different types of sensors are connected to a common bus having four wires. Analog and digital signals are transferred bi-directionally on the common communication bus between the distributed sensors and an application specific controller referred to as a bus converter/controller module (BCM). The traditional analog type sensors are connected to the communication bus through interface modules referred to as transducer to bus interface modules (TBIM). The TBIM provides sensor identification, self-test, data correction functions, and bi-directional digital communication over the network.

A sensor system according to the present invention comprise a plurality of sensors coupled to a first communication bus. A bus converter device coupled to the first communication bus controls the sensors and converts sensor signals received from the sensors on the first communication bus to a format compatible with a second communication bus. The system includes a host computer coupled to the second communication bus that controls the bus converter device. In a preferred embodiment, each sensor comprises a transducer providing an analog transducer signal and an addressable transducer bus interface device coupled to the transducer that is operative to condition the analog transducer signal and to convert the conditioned signal to a digital signal format for communication to the bus converter device.

The present invention improves sensor performance by implementing data correction of the measurement signals. Each sensor transfers analog or digital sensed data one at a time under control of the bus converter device through the common bus. The bus converter device can address a particular sensor on the bus by sending an address code that is unique to each sensor. The bus device module sends digital commands to the sensors prompting them to enter into different states of operation. These operation modes include send analog data, send digital data, start data acquisition, send identification code, perform self test, retrieve or program calibration constants and perform data correction. The identification command allows transducer identification across the bus. The self test command starts internal self checking of the sensor. The acquire data or trigger command allows the sensors on the bus to synchronize the acquisition of data and maintain phase coherence. Sensor self test may include techniques based on the methods described in "Method and Apparatus for Self Testing a Transducer System", U.S. Pat. No. 5,220,519, and "Method and Apparatus for Calibrating Resistance Bridge Type Transducers", U.S. Pat. No. 5,121,064, both of which are assigned to the assignee of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE PREFERRED EMBODIMENT

Figure 1:
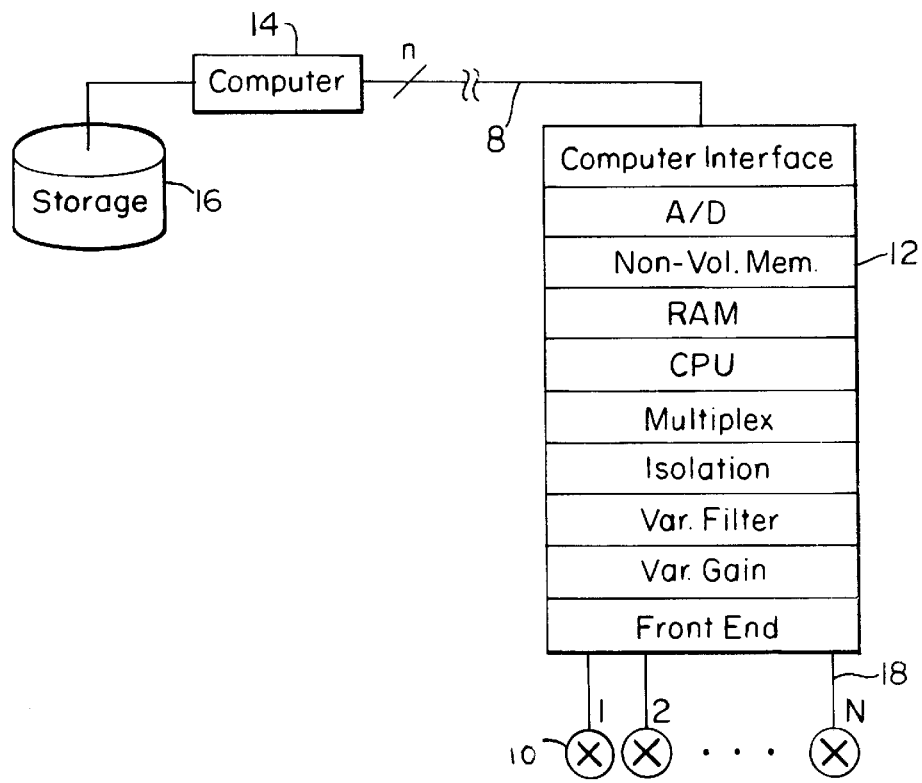
FIG. 1 is a functional block diagram of a prior art data acquisition and analysis system.

A functional block diagram of a typical prior art data acquisition and analysis system is shown in FIG. 1. The system includes one through N analog transducers 10 of different types each having a separate cable connection 18 to a functional interface block 12. Each of the different sensors provides a sensor signal relating to a measurement of differing characteristics, such as voltage level, frequency and charge (picocoulombs). The functional interface block 12 provides several system functions which may be spread out across multiple system units. The functional interface block 12 provides standard functionality such as front end signal conditioning, gain, filtering, multiplexing and A/D conversion. A computer 14 controls data acquisition and analysis of the processed signals received from the functional interface block 12 over multiple interfaces 8.

Figure 2:
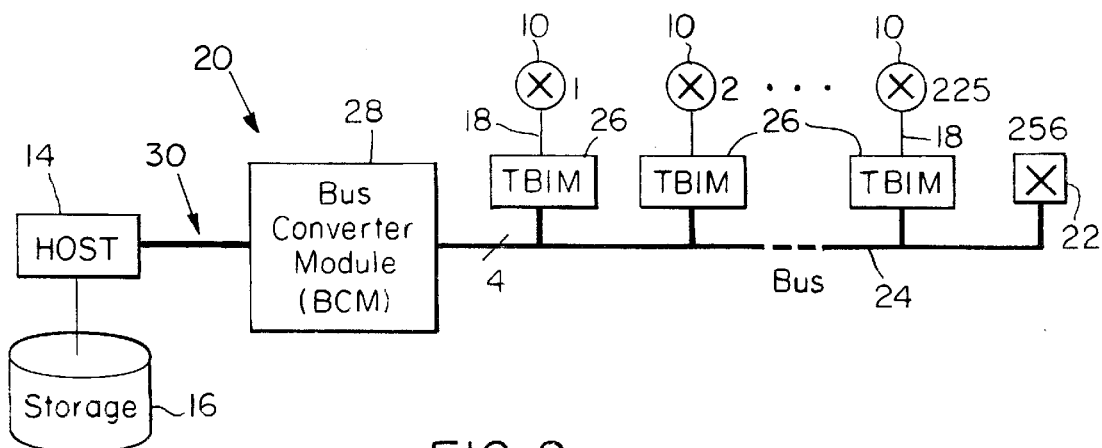
FIG. 2 is a schematic block diagram of an intelligent sensor system in accordance with the present invention.

Referring now to FIG. 2, an intelligent sensor system 20 is shown which illustrates the principles of the present invention. The system 20 generally comprises multiple sensors or transducers 10 coupled to a communication bus 24 through individual interface devices referred to as transducer to bus interface modules (TBIM) 26. The multiple sensors may also vary according to type and function, as noted above with respect to the prior art system of FIG. 1. The communication bus 24 couples the TBIMs 26 to a device referred to as a bus converter/controller module (BCM) 28. The bus converter module 28 performs a conversion function between signals on the communication bus 24 and a conventional computer system bus 30 which couples the bus converter module 28 to a host computer 14 for data acquisition and analysis.

The sensor communication bus 24 comprises four wires: power (PWR), analog/digital input/output 1 (A1DIO), analog/digital input/output 2 (A2DIO) and ground (GND). The following table summarizes their functions:

| HARDWARE LINE | ANALOG MODE | DIGITAL MODE |
| --- | --- | --- |
| PWR | 15 VDC | 15 VDC |
| A1DIO | Sensing Parameter 1 | Balanced Diff.I/O+ |
| A2DIO | Sensing Parameter 2 | Balanced Diff.I/O− |
| GND | Ground | Ground |

The intelligent sensor system 20 of the present invention has two basic modes of operation: a digital mode and an analog mode. The analog or digital mode may be selected by changing the PWR line voltage level or via a digital command from the BCM. In the analog mode, a particular enabled sensor sends analog measurement signals associated generally with sensing parameters 1, 2 on the A1DIO and A2DIO lines, respectively. In a particular instance, for example, the A1DIO line may carry vibration data from a vibration sensor and the A2DIO line may carry temperature data. Other sensing parameters may include pressure, force, acceleration, and flow. The listing of the preceding sensing parameters is meant to be illustrative only and is not meant to limit the scope of the present invention.

The analog mode includes a self test mode in which a particular sensor is commanded by the BCM 28 on the A2DIO line to enter a self test mode. In the self test mode, the enabled sensor sends an analog test signal back to the BCM on the A1DIO line which contains the required information for the BCM 28 to determine if the sensor is operating correctly.

In the digital mode of operation, digital signals are transferred bi-directionally between the BCM 28 and the particular enabled sensor. The digital data may carry sensor setup and status information or may carry sensor measurement information, depending upon the operational state. The A2DIO line can be used to send a clock signal from the BCM 28 or it can be used as a differential line in conjunction with the A1DIO line to transfer bi-directional digital data. A self test can also be entered by sending a test signal on the A2DIO line and a digital command to the A1DIO line.

It should be noted that the functions of the TBIM 26 may be combined with a conventional sensor 10 to provide a smart sensor 22 which can be coupled to the bus 24.

Figure 3:
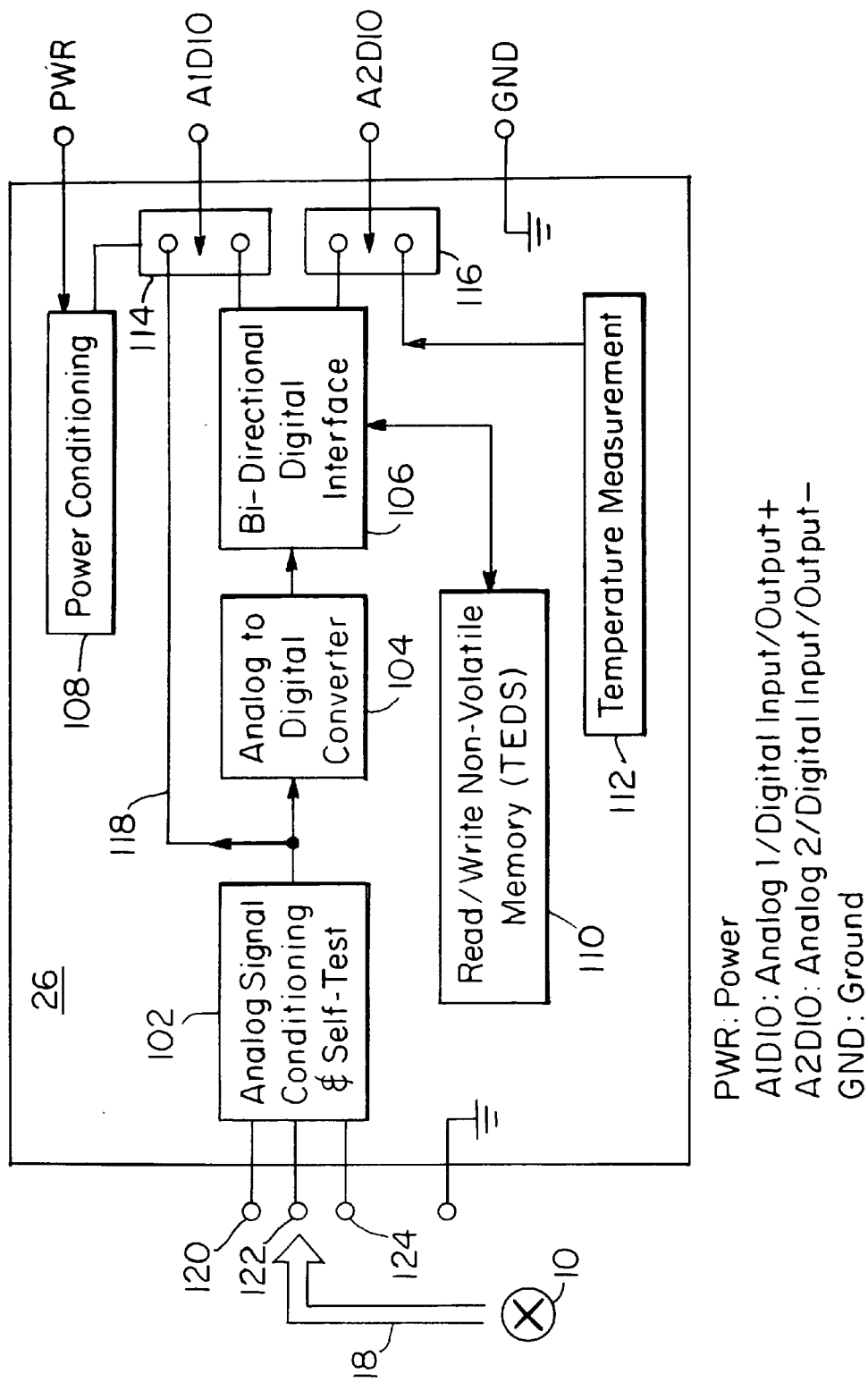
FIG. 3 is a schematic block diagram of a transducer bus in-line module for use in the system of FIG. 2.

Referring now to FIG. 3, the TBIM 26 will now be described. As noted above, the TBIM 26 allows conventional transducers 10 to interface to the common communication bus 24. The TBIM 26 accepts signals from traditional analog transducers on inputs 120, 122, and 124 and conditions the signals for either digital or analog format depending on the operating mode. The TBIM 26 includes an analog signal conditioning and self test block 102, an analog to digital converter 104, a bi-directional digital interface 106, power conditioning 108, a read/write non-volatile memory 110 and a temperature measurement block 112. The read/write non-volatile memory 110 contains transducer specific information preferably in the format of Transducer Electronic Data Sheet (TEDS). When outputting digital data, the TBIM 26 can compensate for temperature related transducer inequities (sensitivity, ZMO) before placing the data on the communication bus 24 through the analog signal conditioning block 102 and couple the conditioned signal through series connected A/D converter 104 and bi-directional digital interface 106. When outputting analog data, the TBIM 26 provides a buffered uncompensated (raw) analog signal 118 to the communication bus 24. In a particular embodiment, 256 sensors can be interconnected through the four wire communication bus 24.

The TBIM 26 is controlled via commands received from the BCM 28. Some examples of actions taken in response to receiving a command are output of analog signals, start of data acquisition, output of digital data, sending identification code, performing self test, and performing data correction. Data phase coherence among the transducers 10 on the bus 24 is controlled by the BCM 28 via a global trigger command. A global trigger command results in simultaneous data samples being taken by the various transducers connected to the bus.

In a power up, the TBIM 26 initializes in a digital listener mode of operation. The TBIM 26 performs a self test of its internal electronics and waits for the BCM 28 to poll the communication bus 24 in search of newly installed TBIMs 26. The TBIM 26 is not able to communicate through the network communication bus 24 until it has been assigned a bus ID.

The TBIM 26 has a query/programming/execute mode in which the following commands can be sent to the TBIM: 1) Execute a self test. Self test consists of in situs testing techniques and current calibration of the transducer 10, as well as testing of its internal electronics using standard methods. A pass/fail code is transmitted to the BCM 28 after completion of the self test. 2) Write TEDS. 3) Auto-Zero, the analog signal conditioning electronics. 4) Place the TBIM in continuous data acquisition mode. 5) Place the TBIM in analog mode. 6) Place the TBIM back into query/programming/execute mode. 7) Reset the TBIM.

The BCM 28 can read TEDS, status/failures, and transducer digital data (corrected or raw) from the TBIM 26.

Any or all of the TEDS information can be read from the non-volatile memory 110 of TBIM 26. The TEDS consist of the following standard information:

1. Manufacturer's identification
2. Model number
3. Revision code
4. Serial number
5. Date code
6. Lower range limit
7. Upper range limit
8. Physical units
9. Warm-up time
10. Uncertainty
11. Data model significant bits (assumes N byte unsigned integer)

12. Description/Comment
13. Calibration table
14. Check sum of TEDS

This information is consistent with the TEDS formats described in IEEE draft standard P1451.2 D2.01 (Oct. 17, 1996).

In the continuous data acquisition mode, data acquisition and data transmission speed are optimized. Data is acquired and transmitted in a continuous process synchronized by the BCM 28. The TBIM 26 may transmit digital data in any one of the following standard formats:

1. Corrected 12-bit pressure
2. Corrected 8-bit temperature
3. Uncorrected 12-bit pressure
4. Uncorrected 8-bit temperature
5. Corrected 12-bit pressure and 8-bit temperature
6. Uncorrected 12-bit pressure and 8-bit temperature.

The TBIM 26 will exit the continuous data acquisition mode once it receives a command to return to either the analog or query/programming/execute mode.

In the analog mode, the TBIM 26 provides analog signals through the balanced differential bi-directional digital communication lines A1DIO, A2DIO. Only one TBIM 26 at a time can be selected by BCM to provide its analog outputs. The A1DIO and A2DIO lines on the communication bus 24 will return to the balanced differential bi-directional digital communication state when the TBIM 26 receives a command to return to continuous data acquisition or query/programming/execute mode.

When the communication bus 24 is placed in either of the digital modes, that is, continuous data acquisition or query/programming/execute modes, the A1DIO and A2DIO lines take on the characteristics of an RS-485 communication protocol which is a bi-directional balanced transmission line standard that supports multipoint connections and allows the creation of networks and transmission over significant distances.

Figure 4:
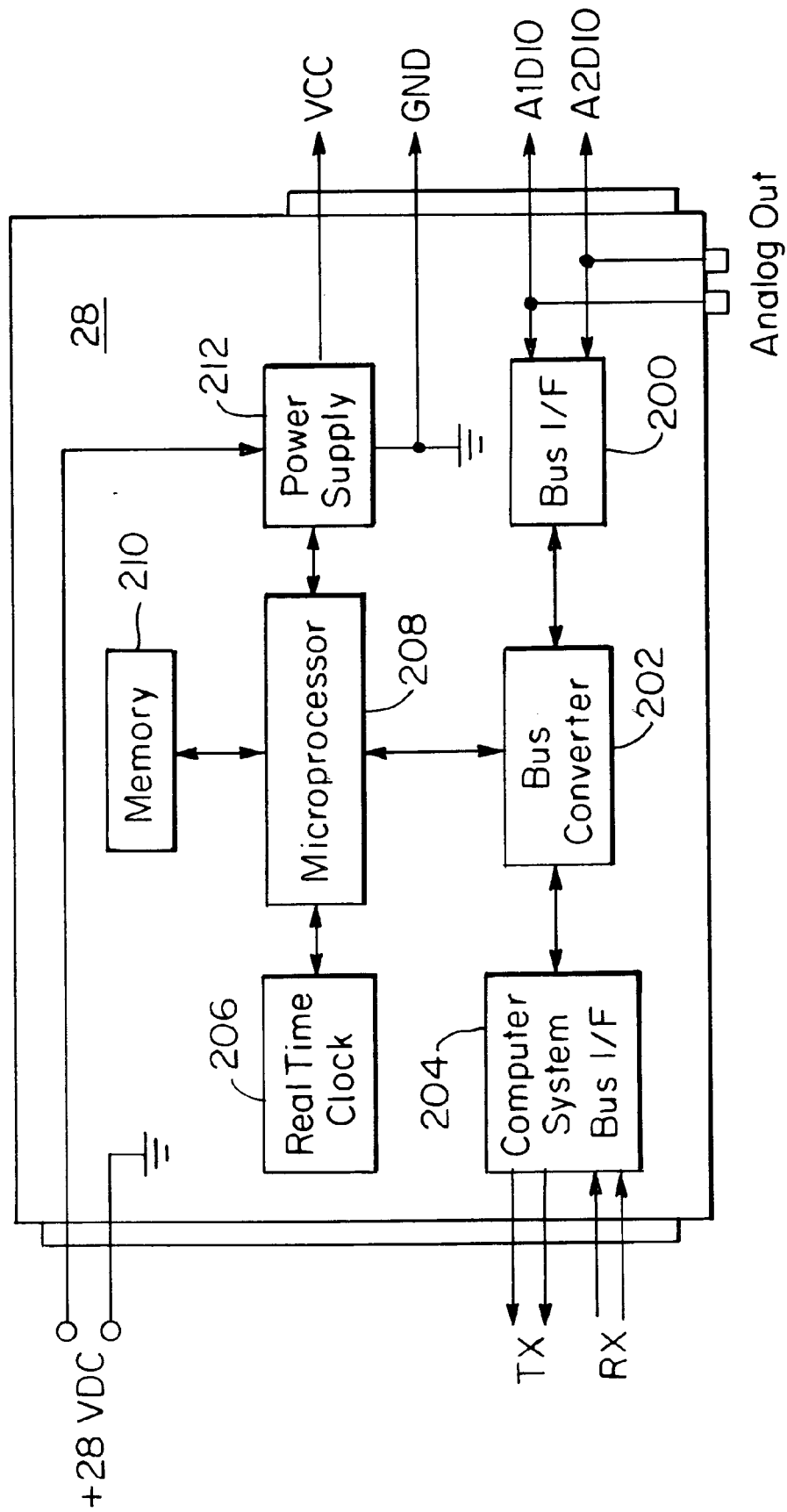
FIG. 4 is a schematic block diagram of a bus converter module for use in the system of FIG. 2.

Referring now to FIG. 4, the bus converter module (BCM) 28 translates bi-directional digital communication signals between the communication bus 24 and a standard computer system bus 30 such as an ARINC-429 bus, IEEE 1451.2 bus, Ethernet bus or any other digital bus. The BCM 28 is the master of the communication bus 24 and is able to 1) assign bus IDs to TBIMs 26; 2) read/write transducer electronic data sheet (TEDS) from /to a TBIM; 3) configure the TBIM to provide an analog output; and 4) continuously read and time stamp digital data (raw or corrected) of both primary and secondary outputs of all enabled TBIMs.

The BCM 28 comprises a bus interface 200 coupled to the communication bus 24, a computer system bus interface 204 coupled to the standard computer bus 30, and a bus converter 202 which provides translation between the buses 24, 30. The bus interface 200 takes on the characteristics of a RS-485 communication protocol when the BCM operates in digital modes. The bus converter 202 is controlled by a microprocessor 208. The microprocessor 208 receives timing from a real-time clock 206 and stores information in a memory 210. A power supply 212 provides power to the BCM 28 as well as power and ground signals on the communication bus 24. The BCM includes an analog output 214 for connecting analog signals received on the communication bus 24 to external analysis equipment.

The host computer 14 (FIG. 2) can perform the following functions through computer system bus interface 204: 1) retrieve the number and type of TBIMs present on the communication bus 24; 2) enable/disable any TBIM on the bus 24; 3) read/write TEDS; 4) configure any TBIM to provide an analog output; 5) continuously read digital data (raw or corrected) of both primary and secondary analog outputs of all enabled TBIMs; 6) set sampling schedule for each TBIM installed and 7) set the internal real-time clock 206 of each TBIM for synchronization purposes.

Bi-directional communications on the communication bus 24 in a preferred embodiment are performed at a rate of 115.2 kbps. The BCM 28 is able to automatically identify the presence of any TBIM 26 on the bus 24 at power up, and it will continuously poll the communication bus 24 to detect any TBIM 26 added to the bus after power up if the BCM is not in the analog or continuous data capture mode. The BCM 28 does not need to be powered down to connect or disconnect any TBIM 26. Any TBIM added to the bus will not disrupt the acquisition of data. This allows for hot swap or live insertion of TBIMs.

Similar to the TBIM 26, the BCM 28 has four modes of operation: 1) power up; 2) query/programming/execute; 3) continuous data acquisition; and 4) analog. The BCM 28 stores the settings for all of the functions in its internal memory 210. At power up, the BCM will automatically restore the settings from the last session if it finds that the communication bus configuration has not changed. The BCM 28 performs the following functions at power up: 1) performs a self test consisting of verifying proper operation of program, data memory and non-volatile memory; 2) reads the communication bus configuration to identify all TBIMs connected to the bus and to assign all newly connected TBIMs a bus address or ID; 3) read TEDS from all connected TBIMs; 4) commands all connected TBIMs to perform a self test; 5) reports any failures to the host computer 14.

The BCM 28 enters into the query/programming/execute mode after power up. In this mode, the BCM 28 continuously polls the communication bus to detect any TBIM added to the bus after power up. The following commands can be sent to the BCM 28 from the host 14: 1) run self test consisting of verifying proper operation of program, data memory and non-volatile memory; 2) command any or all (global) connected TBIMs to perform a self test; 3) write TEDS to any or all (global) connected TBIMs; 4) set internal real-time clock; 5) program data acquisition sampling schedule for any or all connected TBIMs; 6) enable/disable any or all connected TBIMs; 7) auto-zero the analog signal conditioning electronics of any or all TBIMs; 8) place the BCM 28 in continuous data acquisition mode; 9) place the TBIMs in analog mode; 10) place the BCM back into query/programming/execute mode; 11) reset any or all connected TBIMs; 12) reset the BCM 28.

The host computer 14 can read the following information from the BCM 28: 1) communication bus configuration identifying all TBIMs connected to the bus; 2) TEDS information from any connected TBIM or all TBIMs; 3) status/failures from any or all connected TBIMs; 4) data acquisition sampling schedule for any or all connected TBIMs; 5) a single data point (corrected or raw) from any or all TBIMs; 6) internal real-time clock.

When the BCM 28 is placed in continuous data acquisition mode, the BCM continuously transmits digital data from all enabled TBIMs through the computer system bus interface 204 in any of the following formats:

1. Corrected 12-bit pressure
2. Corrected 8-bit temperature
3. Uncorrected 12-bit pressure
4. Uncorrected 8-bit temperature 5. Corrected 12-bit pressure and 8-bit temperature 6. Uncorrected 12-bit pressure and 8-bit temperature.

Data is transmitted according to the sampling schedule programmed in the memory 210 of the BCM 28. Data phase coherence among the transducers on the communication bus is controlled by the BCM via a global trigger command. A global trigger command results in simultaneous data samples being taken by the various transducers connected to the bus. The BCM will exit the continuous data acquisition mode once it receives a command to return to either analog or query/programming/execute mode.

The balanced differential bi-directional digital communication lines A1DIO and A2DIO provide the analog outputs of the selected TBIM when the communication bus 24 is placed in analog mode. Only one TBIM at a time can be selected to provide its analog outputs. The A1DIO and A2DIO lines will return to the balanced differential bi-directional digital communication state when the BCM 28 receives a command from the host 14 to return to continuous data acquisition or query/programming/execute mode.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A sensor system comprising:

a first communication bus;

a plurality of sensors coupled to the first communication bus for providing sensor signals;

a bus converter device coupled to the first communication bus operable to control the plurality of sensors and to convert sensor signals received on the first communication bus to a format compatible with a second communication bus; and a host computer coupled to the second communication bus for controlling the bus converter device;

wherein in an analog mode the first communication bus carries analog sensor signals and wherein in a digital mode the first communication bus carries digital sensor signals.

2. The system of claim 1 wherein each sensor is an intelligent sensor comprising a transducer providing an analog measurement signal and an addressable transducer bus interface device coupled to the transducer operable to condition the analog measurement signal and to convert the conditioned analog measurement signal to a digital signal format for communication to the bus converter device.

3. The system of claim 2 wherein the addressable transducer bus interface device comprises:

an analog conditioner for conditioning the analog measurement signal;

a converter circuit for converting the conditioned analog measurement signal to a digital measurement signal; and an interface circuit for transmitting the digital measurement signal to the bus converter device over the first communication bus.

4. The system of claim 3 wherein the interface circuit is operable to receive and transmit transducer specific information from and to the bus converter device over the first communication bus.

5. The system of claim 4 wherein the transducer bus interface device further comprises a memory for storing the transducer specific information.

6. The system of claim 2 wherein the bus converter device is operable to send a global trigger command to the plurality of sensors to cause the sensors to acquire analog measurement signals from their respective transducers simultaneously.

7. A communication device comprising:

an analog signal conditioner for conditioning analog measurement signals received from a transducer;

a converter circuit for converting the conditioned analog measurement signals to digital measurement signals; and a bus interface for connecting signals to a communication bus wherein in an analog mode, the conditioned analog measurement signals are transmitted over the communication bus and wherein in a digital mode, the digital measurement signals are transmitted over the communication bus.

8. The communication device of claim 7 wherein the bus interface is operable to receive transducer specific information.

9. The communication device of claim 8 further comprising a memory for storing the transducer specific information.

10. The communication device of claim 7 wherein in a continuous data acquisition mode the device transmits digital measurement signals continuously.

11. A method of communication comprising the steps of:

a) coupling sensor signals from a plurality of sensors to a first communication bus wherein in an analog mode the first communication bus carries analog sensor signals and wherein in a digital mode the first communication bus carries digital sensor signals;

b) converting the sensor signals received on the first communication bus in a bus converter device to a format compatible with a second communication bus; and c) coupling a host computer to the second communication bus for controlling the bus converter device and receiving the sensor signals.

12. The method of claim 11 wherein step a) includes:

for each sensor, providing an analog measurement signal, conditioning the analog measurement signal, and converting the conditioned analog measurement signal to a digital format.

13. The method of claim 11 further comprising storing sensor specific information in a sensor memory.

14. The method of claim 11 further comprising sending a global trigger command to the plurality of sensors to cause the sensors to acquire analog measurement signals simultaneously.

15. A method of communication comprising the steps of:

acquiring an analog measurement signal from a transducer;

conditioning the analog measurement signal;

converting the conditioned analog measurement signal to a digital measurement signal;

in a digital mode, transmitting the digital measurement signal over a first communication bus to a bus converter device, and in an analog mode, transmitting the conditioned analog measurement signal over the first communication bus to the bus converter device; and converting the digital measurement signal in the bus converter device to a format compatible with a second communication bus.

16. The method of claim 15 further comprising storing transducer specific information in a memory.

* * * * *